United States Patent Office 3,594,470
Patented July 20, 1971

3,594,470
CHEWABLE TABLETS INCLUDING COATED PARTICLES OF PSEUDOEPHEDRINE-WEAK CATION EXCHANGE RESIN
Saul Borodkin, Libertyville, and Dean Paul Sundberg, Lake Forest, Ill., assignors to Abbott Laboratories, North Chicago, Ill.
No Drawing. Filed Feb. 19, 1968, Ser. No. 706,679
Int. Cl. A61k 9/00
U.S. Cl. 424—32
8 Claims

ABSTRACT OF THE DISCLOSURE

Pharmaceutical tablets containing basic-reacting drugs are made chewable and palatable by adsorbing the drug on a weak cation exchange resin of specific particle size and coating these particles thereafter but before tableting.

---

Chewable tablets are a very convenient way to administer drugs to human patients because many patients, particularly children, are unable or unwilling to swallow entire tablets. For such patients, the only other dosage form for oral administration are syrups or finely divided particles, but both of these forms are impractical because the dosage must be measured for each administration unless capsules are used for divided particles. Capsules may again be objectionable to those patients unable or unwilling to swallow them and are, furthermore, expensive to manufacture.

Chewable tablets, on the other hand, have heretofore been acceptable only when the active drugs involved were palatable to the taste. However, many drugs reacting basic and containing at least one amino nitrogen atom are not palatable; they are bitter and/or produce an unacceptable after taste. Various methods have been proposed in the past to overcome bitterness or aftertaste of such drugs from chewable tablets: in some instances, heavy loading with taste-masking and flavoring ingredients may be sufficient, but with very bitter drugs or drugs that have to be administered in relatively large dosages, taste-masking is unsuccessful. Others have proposed to adsorb the drug on a resin. However, if the bond between the drug and the resin is very strong, the formed complex does not dissociate rapidly in the stomach, resulting in delayed action of the drug. If the complex formed is weakly bonded, the desorption may already take place in the mouth with a bitter taste resulting therefrom.

It is thus the main object of the present invention to provide a method for the manufacture of chewable tablets from bitter drugs. Another object of this invention is to provide a chewable tablet containing one or more bitter drugs which is palatable to the taste and pleasant to chew. It is a further object to provide a chewable tablet which exposes the active ingredient therein promptly after reaching the stomach but prevents exposure thereof in the mouth.

These and other objects are accomplished by providing a process for making palatable, chewable tablets from drugs which in their free form react basically and which contain at least one basic amino group, which process consists essentially in absorbing said amino-group containing drug or a non-toxic, water-soluble acid addition salt thereof on a weakly acidic cation exchange resin with an exchange capacity of at least 6 meq./g. and consisting of discrete particles of 50 to 420 micron diameter to form a complex between said drug and said resin particles, coating said complex particles with a film-forming, water-permeable polymer or polymer mixture, and compressing said coated particles into a tablet, said coating polymer or polymer mixture being selected in such amount and manner that no more than 4% of the drug leaches out from the coated complex particles within two minutes after submerging said particles in artificial saliva.

Among the above-defined weakly acidic cation exchange resin, those with an exchange capacity of at least about 10 meq./g. are preferred. Chemically, suitable ion exchange resins are those which have free carboxylic acid groups to which a basic reacting drug can be absorbed. The most common representatives of these resins are those based on polymers of acrylic acid, e.g. acrylic acid polymers and co-polymers, methacrylic acid polymers and co-polymers wherein the other monomer preferably is based on the same or similar matrices, e.g. styrene, methyl acrylate, methyl methacrylate, acrylonitrile, butadiene or other polymerizaable vinyl compounds. Exchange resins with free sulfonic acid groups are not suited because the formed drug/resin complex is so strong that the drug is released therefrom too slowly or incompletely. Resins containing sulfonic acid groups have exchange capacities below 5 meq./g.

The above range of particle diameters is an important parameter in the process of making the chewable tablets of this invention: with particles of a diameter below 50 microns, processing of the discrete particles is difficult due to dusting, poor flowability, slow flow-through rate, and other mechanical difficulties asociated with small particles; particles of a diameter above 420 microns result in tablets which, when chewed, create a peculiar and uncomfortable mouthfeel.

The term "water-permeable" used in describing the polymers or polymer mixtures for coating the individual complexed particles is used to indicate that fluids of the alimentary canal will permeate or penetrate the coating film with or without dissolving the film or parts of the film. Depending on the permeability or solubility of the chosen polymer or polymer mixture, a lighter or heavier application thereof is required so that the drug does not leach out from the complex to an extent of more than 4% in artificial saliva at 20–40° C. in 2 minutes. Experimentation shows that no significant adverse taste perception is obtained if observed with particle coatings falling within the above permeability definition. Ordinarily, chewable tablets remain in the mouth only for a period of less than 20 seconds, so that the above limitation sufficiently covers the particular requirement for a chewable tablet. On the other hand, the requirement calling for a water-permeable coating is meant to indicate prompt and complete exposure of the drug/exchange resin complex in the stomach; the acid of the stomach will then penetrate the complex and release the active drug therefrom.

In a general embodiment, the tablets of the present invention are prepared by dissolving the drug which contains at least one basic amino group, or a water-soluble salt thereof, in water and absorbing it to granules of the required size of a weakly acidic cation exchange resin by passing the drug solution through a column filled with said resin. With the free base of a drug, the hydrogen-cycle form of the resin is used; with a salt of the drug, the resin is used in its alkali-cycle. The drug/resin complex particles are dried and then coated in a coating pan, by air-suspension or by particle coating with a water-permeable polymer e.g. methylhydroxypropylcellulose, in known manner, using sufficient polymer solution or dispersion to insure substantially complete film coverage of the resin/drug particles. The polymer solution or dispersion used for this coating process may suitably contain the usual tableting excipients such as dyes, pigments, flavoring agents, plasticizers, dispersing agents and the like. The coated complexes are then dried and tableted in the usual fashion. In the tableting step, fillers, binders, lubricants, disintegrants, diluents, dyes, pigments or flavoring agents may be added if desired.

In order to illustrate specific embodiments of the present invention, reference is made to the following examples which, however, are not intended to limit this invention to these illustrations.

EXAMPLE 1

(a) Five kilograms of Amberlite CG–50 (a weak cation exchange resin with a $pK_a$ of 6.1 marketed by Rohm & Haas) with a mesh size of 100 to 200 (particle diameters of 74–149 microns) is slurried in 50 liters of 1.0 N sodium hydroxide for 30 minutes. The slurry is placed in a 5-foot glass column of 12-inch diameter. Water is passed upwards through the resin bed for two hours to eliminate extremely fine particles with the flow rate adjusted to allow the resin bed to expand 2 to 3 times its settled volume. Subsequently, 50 liters of 1.0 N sodium hydroxide solution is passed downwards through the column at a flow rate of about 1 liter per minute followed, in turn, by 25 liters of water to eliminate excess sodium hydroxide, 120 liters of a 5% acetic acid solution, and 25 liters of water. The resin is then removed from the column and tested for its extractable content. It is found to contain less than 0.2% volatile water-extractables. The resin is then placed in the column again and converted to its sodium form by passing 50 liters of 1.0 N sodium hydroxide through the column followed by 25 liters of water.

(b) A solution of 20 kg. of $d$-pseudoephedrine hydrochloride in sufficient water to make up 200 liters of solution is passed through the column prepared as shown above at a rate of about 1 liter per minute, followed by 25 liters of water. The effluent is collected for recovery of unabsorbed pseudoephedrine. Vacuum is used to remove any excess solution. The pseudoephedrine/Amberlite complex formed is removed from the column and dried in trays at 50° C. under reduced pressure for 48 hours to yield 10.1 kg. of the dry complex. Assays show that the complex contains 54.9% pseudoephedrine which is equivalent to 670 mg. of pseudoephedrine hydrochloride per gram of complex.

(c) Three kilograms of the pseudoephedrine/amberlite complex are charged into a 12-inch diameter air-suspension coating column and coated with 25 liters of a coating solution containing 40 g. of ethylcellulose (10 cps.), 10 g. of methylhydroxypropylcellulose (10–12 cps.), 0.03 g. of Yellow Dye, FD & C #6, and 500 ml. of methylene chloride per liter of solution, the remainder being ethanol. The fluidizing air is passed through the column at a rate of 144 standard ft.$^3$/min.; the inlet temperature is maintained at 50 to 55° C. resulting in an outlet temperature of 40 to 45° C. After the coating solution is exhausted, fluidizing the bed is continued with air of sufficient temperature to maintain the outlet temperature at 45° C. Analysis of the coated complexed particles shows the following composition: 41.2% pseudoephedrine, 33.9% Amberlite, 19.9% ethylcellulose and 5.0% methylhydroxypropylcellulose.

(d) Chewable tablets are made from the above complexed particles using the following ingredients:

|   | G. |
|---|---|
| (A) Coated particles (equivalent to 60 g. pseudoephedrine HCl) | 119.0 |
| (B) Carbinoxamine maleate | 2.5 |
| (C) Mannitol | 412.8 |
| (D) Sorbitol, crystalline | 70.0 |
| (E) Yellow dye D & C Lake #6 | 0.167 |
| (F) Sodium cyclamate | 33.0 |
| (G) Polyvinylpyrrolidone | 28.0 |
| (H) Carbowax 6,000, milled | 14.0 |
| (I) Magnesium stearate | 5.5 |
| (J) Flavor (tutti-frutti) | 10.0 |
| (K) Ethanol, 19 proof (enough for massing) | |
| Total | 700.00 |

A mixture of B, E, F and G is milled in a Fitzmill grinder with a portion of C. This blend is mixed with D and the remaining C and subsequently massed with K, screened and dried in a warm-air oven. The dried granulation is passed through a 20-mesh screen, placed in a blender, blended with the remaining ingredients A, H, I and J and subsequently compressed into tablets using $^{17}\!/_{32}$ bevel-edge punches with a bisect. Each tablet weighs 700 mg. and contains the equivalent of 60 mg. of pseudoephedrine hydrochloride.

The tablets, when submitted to a trained taste panel for taste evaluation during and after chewing, show to have only very mild or almost unnoticeable bitterness.

(e) In testing drug availability from the above material, 2 g. of the complexed and coated material (before tableting) is slurried in 200 ml. of 0.08 N hydrochloric acid and the cumulative drug dissolution is measured at various time intervals (column A). Also, for comparison, drug availability from chewable tablets made by procedure (d) is tested in the same fashion but after gently grinding the tablets in a mortar to simulate chewing (column B). This test is designed to simulate the action of gastric juice.

| Time, hours | A, percent | B, percent |
|---|---|---|
| ½ | 31.0 | 55.0 |
| 1 | 52.4 | 67.8 |
| 2 | 85.8 | 91.7 |
| 3 | 95.2 | 98.0 |
| 4 | 98.0 | |
| 6 | 100.0 | |

Surprisingly, the desorption of the "chewed" tablets is faster than that of the coated complex particles, indicating a considerably faster onset of expected drug action, and only a short time is required for complete availability of the drug.

(f) In order to test the leach rate (coating efficiency), the granules (1.0 gram) prepared according to step (c) are stirred in 100 ml. of a buffer of pH 7.0 (containing 4.21 g. of dibasic and 1.8 g. of monobasic of sodium phosphate to simulate salvia). Within two minutes, only 2.0% of the pseudoephedrine is released while uncoated granules prepared according to step (b) show a release of 55.5% in the same buffer within the same time period. This test is designed to simulate the action of saliva.

(g) When in the above example the resin described there is replaced by the acid form of Amberlite IR–120 (sulfonic acid resin with exchange capacity of 4.5 meq./g.), granules are obtained which contain 283 mg./g. of pseudoephedrine or an equivalent of 345 mg./g. of its hydrochloride. The absorption of the drug by this resin is more efficient than that with the resin described under (a) above, but the release pattern under simulated gastric conditions is unacceptable: uncoated granules release 35.8% of the drug in 30 minutes, and 55.1% in one hour, when tested as described under (e) above; the corresponding figures for 2, 4 and 6 hours are 69.2%, 81.3% and 90.2%. In contrast thereto, the drug released from the resin described under (a) is above 95% in 30 minutes. Also, with the sulfonic acid resin, less drug is absorbed by unit weight of the resin. This means that about twice as much resin is required for the same amount of drug with the consequence that a much larger amount of resin/drug particles must be coated resulting in bigger tablets. Similarly, impractical results are obtained by using Amberlite XE–69 which is equivalent to Amberlite IR–120 except for particle size.

EXAMPLE 2

The granules prepared according to Example 1(b) are coated in the manner described in Example 1(c) except that different amounts of the coating mixture described there are used. The efficiency of the coating is tested as described in Example 1(f) and the availability of the drug is tested according to Example 1(e).

| Coating as percent of complex | Coating efficiency; leach in 2 minutes, percent | Percent drug released in 2 hours |
|---|---|---|
| 0.0 | 55.5 | 100.0 |
| 24.2 | 3.5 | 92.4 |
| 33.2 | 1.5 | 85.8 |
| 40.6 | 1.5 | 73.9 |
| 52.0 | 1.9 | 60.5 |

As seen from this table, the uncoated particles release the bitter drug to an extent of over 50% in two minutes which is totally unacceptable in all cases where bitter-tasting active ingredients are involved. On the other hand, particles coated with about 25% by weight of the above water-permeable film release only about 3% of the drug in simulated salvia while releasing over 90% of the drug within two hours in simulated gastric juice.

EXAMPLE 3

A solution of 200 g. of desoxyephedrine hydrochloride in 2 liters of water is passed through a column of 50 g. Amberlite CG–50 which was put into its sodium cycle by the procedure shown in Example 1(a) at a rate of 10 ml./min. The column is then washed with 500 ml. of water and the formed resin/drug complex is dried according to Example 1(b). The obtained complex contains 497 mg. of desoxyephedrine (corresponding to 618 mg. of desoxyephedrine hydrochloride) per gram of granules. More than 98% of the desoxyephedrine present is eluted from the resin within ½ hour in the test described under 1(e) above.

The above drug/resin complex is placed in a flask together with a mixture of 3 g. of ethylcellulose 150 ml. of methylene chloride and 150 ml. of heptane. The methylene chloride is allowed to evaporate slowly under stirring the mass of 40° C. After substantially complete evaporation of the methylene chloride, the complex particles are filtered off and dried in a vacuum oven at 50° C. Availability tests (Example 1(e)) show that 88% of the desoxyephedrine is released in ½ hour and 95% in 1 hour. Tasting indicated that the coated complex is essentially free of the objectionable bitterness of desoxyephedrine.

EXAMPLE 4

The process of Example 1 is repeated but the resin described there is replaced with Amberlite IRP–88, a resin differing from the one described in Example 1(a) by being in the potassium form and having a mesh size of between 100–400 (particle diameter of 37–149 microns).

Attempts to work with this commercial type resin fail due to the large amounts of fines: significant flow rates of drug solution cannot be obtained in the column. However, after limiting the resin particles to sizes of 74–149 micron diameters (eliminating particles passing a 200-mesh screen), the procedure outlined in Example 1(b) produces highly satisfactory particles. The drug/resin complex obtained in that manner contains 550 mg./g. of pseudoephedrine (671 mg./g. of its hydrochloride) and the assay results in simulated gastric juice and saliva are almost identical to those shown in Example 1.

EXAMPLE 5

Fifty grams of Amberlite CG–50 is placed in a 1½" diameter glass column and treated as shown in Example 1(a). A solution of 100 g. of methapyrilene hydrochloride in 2 liters of water is passed through the resin bed at a rate of 10–20 ml. per minute, followed by 500 ml. of water. Excess water is removed by vacuum filtration and the drug/resin complex is dried in a vacuum oven at 50° C. The dried complex contains 563 mg./g. of methapyrilene (equivalent to 643 mg./g. of methapyrilene hydrochloride). The drug is almost completely eluted in 10 minutes in the test described in Example 1(e).

After coating the above particles by the process of Example 1(c) and after tableting according to Example 1(d), the availability and coating efficiency test described previously produce results similar to those described in Example 1(e) and 1(f).

EXAMPLE 6

An Amberlite CG–50 column is prepared according to Example 5 and 150 g. of dextromethorphan hydrobromide dissolved in three liters of water of 60–70° C. is passed through the column while maintaining this temperature in the column, at a rate of 15–20 ml. per minute, followed by 500 ml. of hot water. The excess water is filtered off by vacuum filtration and the complex is dried at 50° C. in a vacuum oven. The total yield is 150.1 g. of granules containing 604 mg./g. of dextromethorphan (776 mg./g. as dextromethorphan hydrobromide). More than 98% of the dextromethorphan is eluted from the resin complex within 30 minutes in the test shown in Example 1(e). Coating these particles in the above described fashion produces granules which show similar test results as described in Examples 1(e) and 1(f). The coated particles are found to be without taste or aftertaste.

EXAMPLE 7

This example is designed to show the availability of active material from tablets constructed according to the present invention and shows a comparison to the availability from capsules containing the same amount of drug but without resin or coating and without a complexing resin.

Four human subjects each were used for a study on the chewable tablets prepared according to Example 1 and the study involving plain drug in capsule form. Urine was collected at 0–2, 2–4, 4–8, 8–12 and 12–24 hours after administration of 60 mg. of pseudoephedrine in the described forms. All subjects received two tablets each of 500 mg. of ammonium chloride at 4-hour intervals, starting 17 hours prior to the medication and ending 11 hours thereafter (total dose 9 g. in 28 hours) to acidify the urine, since pseudoephedrine is excreted more readily and consistently under acidic conditions. The urine samples were assayed essentially by th gas chromatographic procedure of Beckett et al. (J. Pharm. Pharmacol., vol 17, Supplement, page 104S of 1965). The samples were assayed in pairs, one from each group, on each day to equalize variation in the assay procedure. The mean results of both groups are tabulated below:

| Time, hours | Tablet mg. (Example 1) | Capsule, mg. |
|---|---|---|
| 0–2 | 4.75 | 14.83 |
| 2–4 | 5.18 | 7.43 |
| 4–8 | 17.51 | 16.13 |
| 8–12 | 18.19 | 10.33 |
| 12–24 | 18.48 | 6.48 |
| Total | 64.11 | 55.21 |

This experiment shows that total drug excretion is higher with the chewable tablets of the present invention. This result is very surprising, since the drug in the present tablet must be desorbed from the drug/resin complex after the gastric juices penetrate the plastic coating.

The weakly acid cation exchange resins used in the process of the present invention are all highly insoluble in gastro-intestinal juices and are thus inert; they can safely be administered without causing any side effects. They pass through the body intact and are excreted in the feces.

As will be understood by those skilled in the art, the more basic the drug to be absorbed, the more efficiently it is adsorbed by the resin. Of course, more efficient absorption could be obtained by using resins with higher absorption rates such as sulfonic acid resins. But these, as explained above, are not suited for the process of the present invention since they adversely affect the desorption of the drug in the gastric juice. The weakly acidic cation exchange resins used in this invention uniquely combine the valuable properties of adsorbing the drug without interfering with its desorption rate. Due to the weak acidity of the resins used in the present process, drug adsorption is not very efficient. For this reason, the average loading efficiency of basic drugs is considerably below the theoretical capacity of the resin.

The drug solution used to make the drug/resin complex can vary within a wide range. Drug solutions of lower than 2% drug concentration are impractical: it takes considerably more time to pass such a dilute solution through the resin bed to adsorb a given amount of drug; the upper limit for the concentration of the drug solution obviously is dictated by the solubility of the drug in the medium used at the temperature of the column. The medium usually is water, but it may be an aqueous mixture with another inert solvent, or the water used to dissolve the drug may also contain other non-toxic materials often used to increase solubility of a particular drug.

The coating materials used for coating the resin/drug complex require no further discussion. Water-permeable coating compositions are well known in the art of tablet coating. They are used in the same fashion as in coating tablets but are applied to the granules of the drug/resin complex and not to a tablet. The amount of coating composition to be applied is well defined by the above limitation: not more than 4% of the drug must leach out into artificial saliva within a period of two minutes at 20-40° C. Among the most popular coating materials are: hydroxypropylcellulose, methylhydroxypropylcellulose, polyethylene oxide and polyvinyl pyrrolidone. These water-soluble polymers can be used alone or in admixture with water-insoluble polymers, such as ethylcellulose, polyvinylacetate, methylacrylate/methyl methacrylate, cellulose acetate phthalate, cellulose acetate butyrate, cellulose acetate propionate, polyvinylidene chloride, zein, and certain waxes as long as the resulting film is water-permeable. In the preferred embodiment, the coating material is applied to the drug/resin complex to the extent of at least 15% by weight of the complex. This insures almost complete taste masking. Where coating is done with water-soluble, film-formers, there is no substantial change of drug availability experienced in the gastro-intestinal juices between coated and uncoated drug/resin particles.

The process described above also provides an additional benefit: some of the basic-reacting drugs to which this invention is directed, cannot be conveniently coated, for instance pseudoephedrine is somewhat explosive and cannot be coated directly by air-suspension coating. However, when combined with the resin, the formed complex can be air-suspension coated without any danger of explosions. Also, in many instances, particle coating is more efficient when the drug particle is absorbed to a resin particle which is known to have better adhesion capacity for polymer coatings.

We claim:
1. The process for making coated particles to be compressed into palatable chewable tablets comprising a non-toxic, water-soluble acid addition salt of pseudoephedrine, consisting essentially in adsorbing said salt on a weakly acidic cation exchange resin with an exchange capacity of at least 6 meq./g. by passing a solution of said pseudoephedrine salt through a column containing discrete particles of said resin in its alkaline cycle and in a particle size of 50–420 micron diameter to form a complex between pseudoephedrine and said resin particles, coating said discrete, individual complex particles with a non-toxic, pharmaceutically acceptable film-forming, water-permeable polymer or polymer mixture by the air-suspension coating method, said coating polymer or polymer mixture being selected in such amount and manner that no more than 4% of the pseudoephedrine leaches out from the coated complex particles within two minutes after submerging said particles in artificial saliva and all of the pseudoephedrine is released readily from said complex upon contact with stomach acid.

2. The process of claim 1 wherein said coating polymer or polymer mixture is applied in an amount of at least 15% by weight of the weight of the resin/drug complex.

3. The process of claim 1 wherein said cation exchange resin has an exchange capacity of at least 10 meq./g.

4. The process of claim 1 wherein said cation exchange resin is a carboxylic acid resin.

5. The coated particles prepared by the process of claim 1.

6. The coated particles of claim 5 wherein said cation exchange resin has an exchange capacity of at least 10 meq./g.

7. The product of claim 5 in palatable, chewable tablet form.

8. The tablet of claim 7 wherein said cation exchange resin is a carboxylic acid resin.

References Cited
UNITED STATES PATENTS

| | | | |
|---|---|---|---|
| 2,611,730 | 9/1952 | Heming | 424—79 |
| 3,070,508 | 12/1962 | Siegel | 424—79 |
| 3,085,942 | 4/1963 | Magid | 424—79 |
| 3,100,738 | 8/1963 | Cavallito | 424—79 |
| 3,138,525 | 6/1964 | Koff | 424—79 |
| 3,143,465 | 8/1964 | Keating | 424—79 |

FOREIGN PATENTS

| | | | |
|---|---|---|---|
| 728,620 | 2/1966 | Canada | 424—79 |

STANLEY J. FRIEDMAN, Primary Examiner

A. P. FAGELSON, Assistant Examiner

U.S. Cl. X.R.

424—16, 31, 79, 330